(12) United States Patent
Schliwa-Bertling et al.

(10) Patent No.: US 9,668,118 B2
(45) Date of Patent: May 30, 2017

(54) METHOD OF TRANSMITTING ETWS NOTIFICATION MESSAGES IN A GERANCELLULAR RADIO SYSTEM

(75) Inventors: Paul Schliwa-Bertling, Ljungsbro (SE); Jens Bergqvist, Linkoping (SE); Claes-Goran Persson, Mjolby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 448 days.

(21) Appl. No.: 13/119,988

(22) PCT Filed: Jun. 9, 2009

(86) PCT No.: PCT/SE2009/050692
§ 371 (c)(1),
(2), (4) Date: Mar. 21, 2011

(87) PCT Pub. No.: WO2010/036179
PCT Pub. Date: Apr. 1, 2010

(65) Prior Publication Data
US 2011/0176473 A1   Jul. 21, 2011

Related U.S. Application Data

(60) Provisional application No. 61/100,023, filed on Sep. 25, 2008.

(51) Int. Cl.
*H04W 4/22* (2009.01)
*H04W 76/00* (2009.01)
*H04W 4/20* (2009.01)

(52) U.S. Cl.
CPC .......... *H04W 4/22* (2013.01); *H04W 76/007* (2013.01); *H04W 4/20* (2013.01)

(58) Field of Classification Search
None
See application file for complete search history.

(56) References Cited

U.S. PATENT DOCUMENTS 6,631,274 B1   10/2003   Keshavachar
8,213,896 B2 *   7/2012   Lee et al. .................. 455/404.1
(Continued)

FOREIGN PATENT DOCUMENTS

EP   1318634 A2   6/2003
EP   1901569 A1   3/2008
(Continued)

OTHER PUBLICATIONS

3GPP TS 44.060 V8.1.0; GSM/EDGE Radio Access Network; published on May 2008.*
(Continued)

*Primary Examiner* — Tejis Daya
(74) *Attorney, Agent, or Firm* — Rothwell, Figg, Ernst & Manbeck, P.C.

(57) ABSTRACT

In a Base Station Subsystem adapted to provide an earthquake and Tsunami Warning System notification message to a User Equipment accessing a cellular radio system using a GSM/EDGE Radio Access Network, GERAN, means are provided for receiving an earthquake and tsunami warning system notification from an emergency centre. In addition means are provided for transmitting the earthquake and tsunami warning system notification to the User Equipment located in affected areas of the message over the Fast Associated Control Channel, FACCH, if the User Equipment is in GERAN dedicated mode and over the Packet Associated Control Channel, PACCH, if the User Equipment is in GERAN packet transfer mode.

8 Claims, 5 Drawing Sheets

(56) References Cited

U.S. PATENT DOCUMENTS

| | | | |
|---|---|---|---|
| 2002/0137532 A1* | 9/2002 | Landais et al. | 455/466 |
| 2004/0048627 A1 | 3/2004 | Olvera-Hernandez | |
| 2009/0239554 A1* | 9/2009 | Sammour et al. | 455/458 |
| 2010/0099439 A1* | 4/2010 | Aghili et al. | 455/458 |

FOREIGN PATENT DOCUMENTS

| | | |
|---|---|---|
| JP | 2004505525 A | 2/2004 |
| WO | 2007045564 A1 | 4/2007 |

OTHER PUBLICATIONS

3GPP TSG GERAN2#28bis, ETWS Primary Notification using CCCH, G2-080398, Jun. 24-27, 2008.*

3GPP TSG GERAN ADhoc#2, GERAN RRC States, GAHW-000039, Oct. 9-13, 2000.*

3GPP TSG-GERAN Meeting #39, LS on ETWS, GP-081323, Aug. 25-29, 2008.*

3GPP Technical Specification Group Services and System Aspects: "3GPP TS 22.168 V8.1.0 (Jun. 2008), Earthquake and Tsunami Warning System (ETWS) Requirements; Stage 1 (Release 8)", 3GPP Draft, TS 22.168, 3rd Generation Partnership Project *3GPP), Mobile Competence Centre, 650 Route Des Lucioles, F-06921 Sophia-Antipolis Cedex, France, vol. 22.168, No. V8.1.0, Jun. 1, 2008, pp. 1-12, XP002533879.

Vodafone, "Handling of Notification over FACCH", 3GPP Draft, GP-051892, 3rd Generation Partnership Project (3GPP), Mobile Competence Centre, 650, Route Des Lucioles, F-06921, Sophia-Antipolis Cedex, France, vol. TSG GERAN, #26, Schaumburg, USA. retrieved on Aug. 17, 2008, 2 pages, XP050014628.

Vodafone, "ETWS for GSM" 3GPP Draft, GP-080142—ETWS Solution for GSM, 3rd Generation Partnership Project (3GPP), Mobile Competence Centre, 650, Route Des Lucioles, F-06921. Sophia-Antipolis Cedex, France, vol. TSG GERAN, #37, Seoul, ROK, Feb. 12, 2008, 4 pages, XP050019493.

Ericsson et al., "Support for Transfer of ETWS Primary Notification Message to Mobile Stations in Dedicated Mode", 3GPP TSG-GERAN #42, GP-091030, [Online], May 11, 2009, pp. 1-6, XP002547276.

Ericsson, "Support for Transfer of ETWS Primary Notification Message to Mobile Stations in Packet Transfer Mode", 3GPP TSG-GERAN2 #40bis, GS-090032 [Online], Jan. 13, 2009, pp. 1-9, XP002547277.

Office Action issued in corresponding Japanese application No. 2011-528979 on Apr. 26, 2013, 3 pages.

Vodafone, "ETWS for GSM", 3GPP TSG GERAN Meeting #37, Seoul, Republic of Korea, Feb. 18-22, 2008, TDoc GP-080142, 4 pages.

3GPP TSG GERAN Meeting #37, Seoul, Republic of Korea, Feb. 18-22, 2008, GP-080217; 3GPP: TSG-GERAN2 Meeting #36bis, Ljubljana, Slovenia, Jan. 14-17, 2008, GS-080100, Change Request, 75 pages.

3GPP TS 23.041, "3rd Generation Partnership Project; Technical Specification Group Core Network and Terminals; Technical realization of Cell Broadcast Service (CBS) (Release 10)", V10.5.0 (Sep. 2012), 53 pages.

3GPP TS 44.018, "3rd Generation Partnership Project; Technical Specification Group GSM/EDGE Radio Access Network; Mobile radio interface layer 3 specification; Radio Resource Control (RRC) protocol (Release 8)", V8.4.0 (Sep. 2008), 403 pages.

3GPP TS 44.060, "3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)", V8.5.0 (May 2009), 587 pages.

Official action dated Jul. 1, 2016 received in corresponding European Application No. 09 788 562.8, 5 pages.

\* cited by examiner

METHOD OF TRANSMITTING ETWS NOTIFICATION MESSAGES IN A GERANCELLULAR RADIO SYSTEM

CROSS-REFERENCE TO RELATED APPLICATIONS

This application is a 35 U.S.C. §371 National Phase Entry Application from PCT/SE2009/050692, filed Jun. 9, 2009, and designating the United States, and also claims the benefit of U.S. Provisional Application No. 61/100,023, filed Sep. 25, 2008. The aforementioned applications are incorporated herein in their entirety by reference.

FIELD OF THE INVENTION

The present invention relates to a method and arrangement for transmitting messages in a cellular radio system system, in particular to transmission of ETWS primary notifications to User Equipment accessing the cellular radio system using GERAN.

BACKGROUND

There is work ongoing within third generation partnership project (3GPP) Global System for Mobile communication/Enhanced Data rates for GSM Evolution (GSM/EDGE) Radio Access Network (GERAN) standardisation in order to introduce support for an Earthquake Tsunami Warning System (ETWS) The ETWS is designed to make it possible to quickly send notifications about coming earthquakes and/or tsunamis to mobile stations (MS). The mobile station is in turn configured to warn the user so that he/she can execute safety measures.

There are requirements to reach the users/mobile stations with a primary notification message within 4 seconds. In order to avoid that fake messages are received causing chaos, inclusion of authentication information in the primary notification will most likely be needed. An alternative that is discussed is to have authentication information in the form of a digital signature (e.g. 41 bytes if using DSA signatures).

Moreover, the mobile station in a GERAN network may be in different modes:

Idle mode, when the mobile station is currently neither used for any speech call or data service;

Dedicated mode, when the mobile station is currently used for a speech call or for a circuit switched data connection;

Packet transfer mode, when the mobile station is currently used for a packet switched data connection (GPRS);

Dual transfer mode, when the mobile station is currently (simultaneously) used for both a speech call and a packet switched data connection (GPRS).

When an ETWS primary notification needs to be sent out through the GERAN network, it is therefore necessary to reach the mobile station within the required time limit (e.g. 4 seconds as now discussed) independent of the mode the mobile station is currently in.

With the existing proposals for transmission of ETWS primary notifications within GERAN, proposed in 3GPP TDoc GP-080142 and 3GPP TDoc GP-081217, mobile stations that are in packet transfer mode can not be reached. In other words, mobile stations that are used for a packet switched service will not be reached by the ETWS warning even though they are in the affected area, where ETWS primary notifications are being transmitted through the GERAN network.

A proposal for transmission of ETWS primary notifications to mobile stations in dedicated mode has been presented in 3GPP TDoc GP-080142. The proposal is that when the Base Station Subsystem (BSS) receives an ETWS primary notification, which it shall transmit to mobile stations in a certain area, it builds point-to-point Short Message Service (SMS) messages containing the ETWS primary notification. Those SMS messages are then sent to the mobile stations in dedicated mode in the affected area through the Slow Associated Control Channel (SACCH). The same proposal would then probably also be used for mobile stations in dual transfer mode. However, there exist some problems with this proposed solution for dedicated mode and potentially also for dual transfer mode:

The use of an SMS (through the SACCH) would not be reliable in case of a simultaneous handover procedure. An ongoing SMS delivery will be interrupted and not re-sent if a handover procedure is triggered, moving the mobile to another cell. The mobile station would then not be reached by the ETWS primary notification.

The need to transmit the point-to-point SMS on the SACCH leads to a long distribution time for the ETWS primary notification.

Hence, there is a need for an improved method and device for transmitting an ETWS notification message in a GERAN system.

SUMMARY

It is an object of the present invention to provide a method and an apparatus that overcomes or reduces the problems as outlined above.

This object and other are obtained by the method and apparatus as set out in the appended claims. Thus, a radio base station is provided for sending an ETWS notification message to a mobile station or user Equipment (UE) accessing a cellular radio system using GERAN. The Base Station Subsystem (BSS) receives an earthquake and tsunami warning system notification from an emergency centre. The Radio Base Station Subsystem then transmits the earthquake and tsunami warning system notification to the user equipment located in affected areas of said communication network over the Fast Associated Control Channel FACCH if the UE is in GERAN dedicated mode and over the PACCH if the UE is in GERAN packet transfer mode.

ETWS primary notification messages may be sent to mobile stations in GERAN dedicated mode by introducing a new application that can be termed APDU for ETWS in the 3GPP Technical Specification (TS) 44.018 Application Information procedure/message. The TS 44.018 Application Information, including the ETWS primary notification message, is then sent on the FACCH to the mobile stations in dedicated mode.

ETWS primary notification messages may be sent to mobile stations in GERAN packet transfer mode by transmitting a TS 44.060 Packet Paging Request message making an ETWS capable mobile station listen to the Common Control Channel (CCCH), where the ETWS primary notification is broadcasted to mobile stations in idle mode. Alternatively, the ongoing Temporary Block Flows (TBFs) are released by the network making the mobile stations listen to the CCCH. As an alternative, the ETWS primary notification message can be sent in a new control message on the Packet Associated Control Channel (PACCH) to the mobile stations in packet transfer mode.

In yet another alternative embodiment, a new control messages may be introduced in order to inform the mobile station in packet transfer mode about the ETWS warning. The new control messages may either carry the actual ETWS Primary Notification message or make the mobile station temporarily listen to the CCCH or another channel where the ETWS Primary Notification is broadcasted to mobile stations in idle mode. The new control message can be sent on the PACCH.

The invention also extends to a network node such as a radio base station subsystem adapted to perm the method as set out above. In addition the invention extends to a User Equipment adapted to receive and process a notification transmitted in accordance with the above and a method of operating such a User Equipment. Using the method and device as described herein will enable transmission of ETWS primary notifications to mobile stations that are in GERAN packet transfer mode. Also, the transmission of ETWS primary notifications to mobile stations in GERAN dedicated mode will be quicker, and safer, since the FACCH may be used instead of the SACCH.

Other objects, advantages and novel features of the invention will become apparent from the following detailed description of the invention when considered in conjunction with the accompanying drawings.

BRIEF DESCRIPTION OF THE DRAWINGS

For a better understanding, reference is made to the following drawings and preferred exemplary embodiments of the invention.

DETAILED DESCRIPTION

Figure 1:
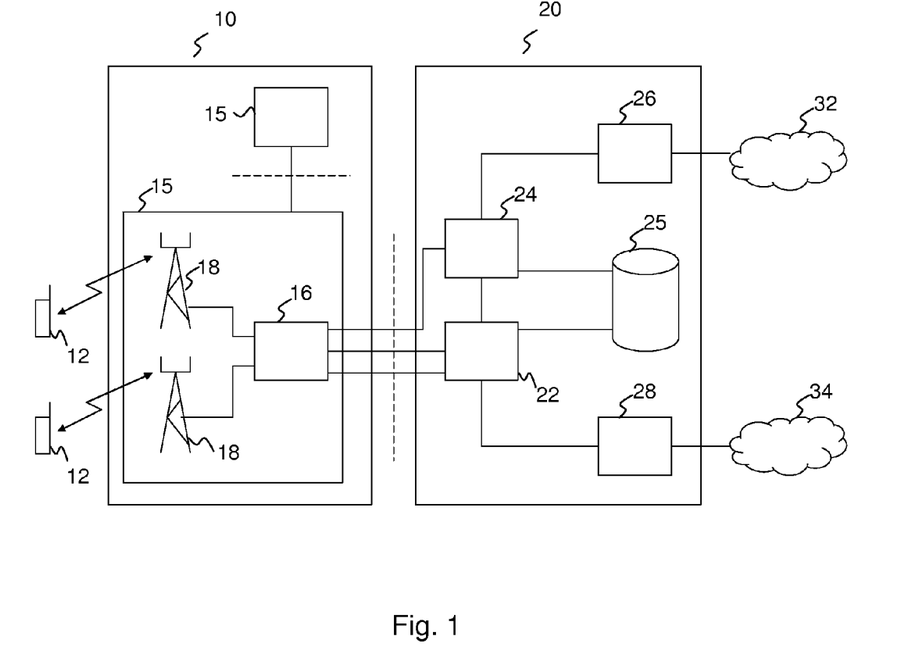
FIG. 1 shows exemplary communication network architecture.
Figure 2:
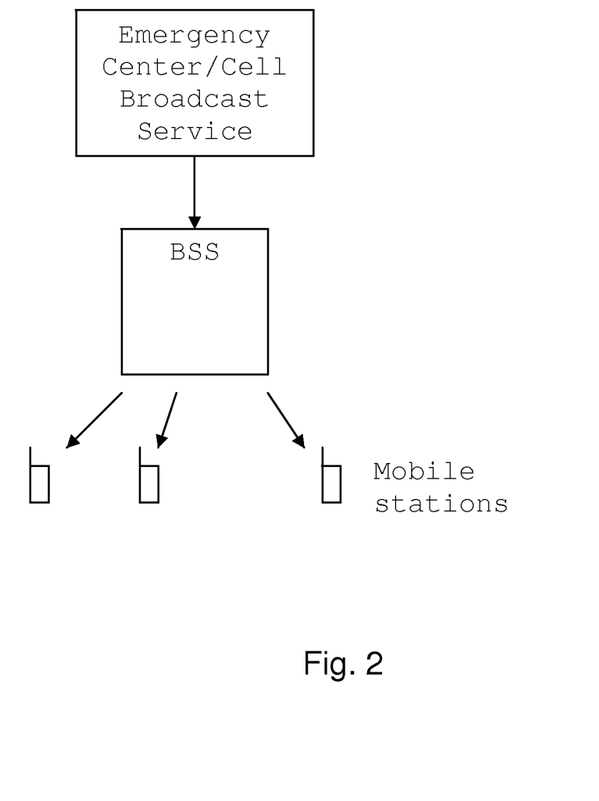
FIG. 2 shows a block diagram of relevant parts of the network architecture.

A block diagram of an exemplary 3GPP GSM system network is shown in FIG. 1. The network comprises a radio access network (RAN), which for example can be a GSM/EDGE Radio Access Network (GERAN) 10 and a core network (CN) 20. The GERAN 10 and the CN 20 provide communication and control for a plurality of mobile stations (MS) 12.

The GERAN architecture 10 comprises a plurality of Base Station Systems (BSS) 15 each controlled by a Base Station Controller (BSC) 16 which is connected to a set of Base Transceiver Stations (BTS) 18. The BTSs 18 comprise antennas, RF equipment and baseband processing circuits needed to communicate with the MSs 12 over an air interface. The BTSs 18 are connected to the BSC 16 through the Abis-interface of the radio system.

The core network 20 typically comprises at least one Serving General Packet Radio Service (GPRS) Support Node (SGSN) 22, one or more Gateway GPRS Support Node (GGSN) 28, at least one mobile switching center (MSC) 24, which may include a visitor location register (VLR) (not shown in FIG. 1), a Gateway MSC (GMSC) 26, and a GPRS home location register (HLR) 25. The CN 20 provides both circuit-switched and packet data communication with various external networks, typically including the Public Switched Telephone Network (PSTN) 32 and one or more packet mode communication network, such as the Internet 34.

According to one embodiment of the present invention, the communication network system is a GSM communication system. The skilled person, however, realizes that the method and arrangement as described herein works in other communications systems as well. The mobile stations 12 may be user equipments such as mobile telephones ("cellular" telephones) and laptops with mobile termination and thus may be, for example, portable, pocket, hand-held, computer-included or car-mounted mobile devices which communicate voice and/or data with the RAN.

Solutions for transmission of ETWS primary notifications to mobile stations in GERAN dedicated mode, packet transfer mode and dual transfer mode will now be described in more detail. In accordance with one embodiment any one of the solution as used for dedicated mode or for packet transfer mode is used also towards mobile stations in dual transfer mode.

An ETWS primary notification is received by the BSS from an emergency center, e.g. the Cell Broadcast Service Centre. The BSS is adapted to transmit the notification to the mobile stations in the affected area (certain cells) independent of the mode of operation of the mobile stations. Some different methods for transmitting the notification to a mobile station will now be described.

Mobile Station in GERAN Dedicated Mode:

In accordance with one embodiment transmission of ETWS primary notifications to mobile stations in dedicated mode is performed using the existing 44.018 APPLICATION INFORMATION message operating on FACCH. A new application that can be termed APDU for ETWS primary notifications is implemented for handling these notifications.

The authentication information can be included in the ETWS Primary Notification message. It can for example comprise 56 octets as set out in 3GPP specification No. 23.041. This will easily fit into an Application Information message as the maximum size of the message is 251 octets.

The existing 44.018 Application Information message is today defined as a low priority message (in section 3.1.6 in 3GPP TS 44.018). In order to make sure that the transmission of ETWS primary notifications are prioritized over the radio interface, a Technical Specification (TS) 44.018 Application Information messages carrying an ETWS primary notification can be given a higher priority than normal Application Information messages. For example such a message can be given either Normal Priority or High Priority.

In accordance with another, alternative, embodiment a new control message can be introduced in order to inform the mobile station in dedicated mode about the ETWS warning. The new control message may either carry the actual ETWS Primary Notification message or make the mobile station temporarily listen to the CCCH or another channel where the ETWS Primary Notification is broadcasted to mobile stations in idle mode. The new control message can be sent on the FACCH.

In yet another alternative embodiment, an ETWS primary notification message can be included in point-to-point SMS messages, which are sent on the FACCH. The SMS messages are then transmitted on the FACCH instead of on the SACCH. Thus, an ETWS primary notification is sent as an SMS message transmitted on the FACCH. These SMS messages can then be built in the BSS and sent to the mobile stations in dedicated mode supporting reception of SMS on FACCH.

Mobile Station in GERAN Packet Transfer Mode:

In accordance with one embodiment the transmission of ETWS primary notifications to mobile stations in packet transfer mode is performed by sending a 44.060 PACKET PAGING REQUEST for Radio Resource (RR) connection establishment, with the Page Mode IE set to "same as before", on the PACCH. A mobile station supporting reception of ETWS primary notifications in GERAN is then configured to temporarily listen to the CCCH, or another channel, where the ETWS primary notification is sent to mobile stations in idle mode.

The Mobile Identity IE can be set to "no identity" in order to transmit the Packet Paging Request message even though no mobile station is being paged. All mobiles stations having a Temporary Block Flow (TBF) on the same Packet Data Channel (PDCH) will be reached with the same Packet Paging Request message.

In an alternative embodiment, the mobile stations in packet transfer mode are made to the CCCH where the ETWS primary notification is transmitted to the mobile stations in idle mode by sending the existing 44.060 PACKET TBF RELEASE message on the PACCH for each ongoing TBF in the affected area. The ongoing TBF session is then released and the mobile station is enabled to listen to the CCCH where it will receive the ETWS primary notification.

In order to avoid that all the active TBF have to be released, but only those for which the concerned mobile station is able to receive ETWS primary notifications, mobile station capability information can be sent from the mobile station to the BSS. The mobile station capability to receive ETWS primary notifications can then be included in the TS 24.008 MS Radio Access Capability information and/or in the MS Classmark information.

In yet another alternative embodiment, a new control messages may be introduced in order to inform the mobile station in packet transfer mode about the ETWS warning. The new control messages may either carry the actual ETWS Primary Notification message or make the mobile station temporarily listen to the CCCH or another channel where the ETWS Primary Notification is broadcasted to mobile stations in idle mode. The new control message can be sent on the PACCH.

Figure 3:
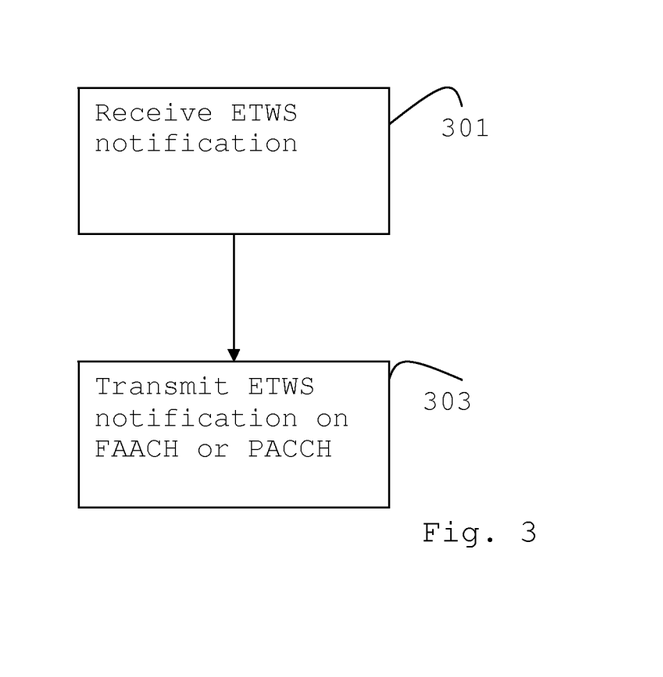
FIG. 3 shows a flowchart illustrating some procedural steps performed when sending an ETWS notification to a User Equipment.

In FIG. 3 a flow chart illustrating some steps performed in a radio base station when providing an ETWS notification message to a mobile station or user Equipment (UE) accessing a cellular radio system using GERAN. First In a step 301 the Radio Base Station receives an earthquake and tsunami warning system notification from an emergency centre. Next, in a step 303, the Radio Base Station transmits the earthquake and tsunami warning system notification to the user equipment located in affected areas of said communication network over the FACCH if the UE is in GERAN dedicated mode and over the PACCH if the UE is in GERAN packet transfer mode.

Figure 4:
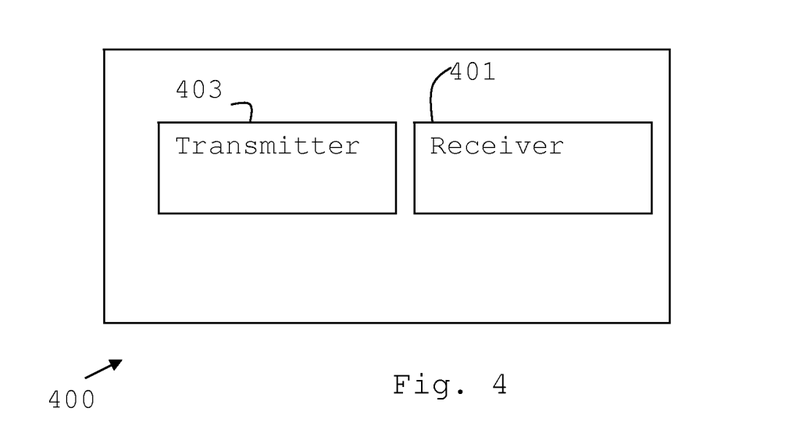
FIG. 4 shows a flowchart illustrating a transmitter for transmitting an ETWS notification to a User Equipment.

In FIG. 4 an arrangement in a communication network node 400, in particular a radio base station, for transmitting an earthquake and tsunami warning to user equipments in a communication network system in accordance with the above is depicted. The communication network node comprises a receiver 401 for receiving an earthquake and tsunami warning system notification from an emergency centre and a transmitter 403 for transmitting the earthquake and tsunami warning system notification to the user equipment located in affected areas of said communication network. The transmitter 403 being adapted to transmits the earthquake and tsunami warning system notification to the user equipment located in affected areas of said communication network over the FACCH if the UE is in GERAN dedicated mode and over the PACCH if the UE is in GERAN packet transfer mode.

According to some embodiments of the present invention, said earthquake and tsunami warning system notification is transmitted with an application information message, when said user equipment is in a dedicated operation mode.

According to some embodiments of the present invention, a new control message is introduced with which said earthquake and tsunami warning system notification is transmitted, when said user equipment is in a dedicated operation mode.

According to some embodiments of the present invention, said earthquake and tsunami warning system notification is transmitted with a point-to-point SMS message on the FACCH, when said user equipment is in a dedicated operation mode.

According to some embodiments of the present invention, said earthquake and tsunami warning system notification is transmitted by sending a packet paging request, when said user equipment is in a packet transfer operation mode, whereby said user equipment listens to a control channel sending said earthquake and tsunami warning.

According to some embodiments of the present invention, said earthquake and tsunami warning system notification is transmitted by sending a packet TBF release message, when said user equipment is in a packet transfer operation mode, whereby said user equipment listens to a control channel sending said earthquake and tsunami warning.

According to some embodiments of the present invention, a new control message is introduced informing said user equipment of said earthquake and tsunami warning system notification, when said user equipment is in a packet transfer operation mode, whereby said user equipment listens to a control channel sending said earthquake and tsunami warning.

According to some embodiments of the present invention, a new control messages is introduced in order to inform the mobile station in packet transfer mode about the ETWS warning. The new control messages may either carry the actual ETWS Primary Notification message or make the mobile station temporarily listen to the CCCH or another channel where the ETWS Primary Notification is broadcasted to mobile stations in idle mode. The new control message can be sent on the PACCH.

Figure 5A:
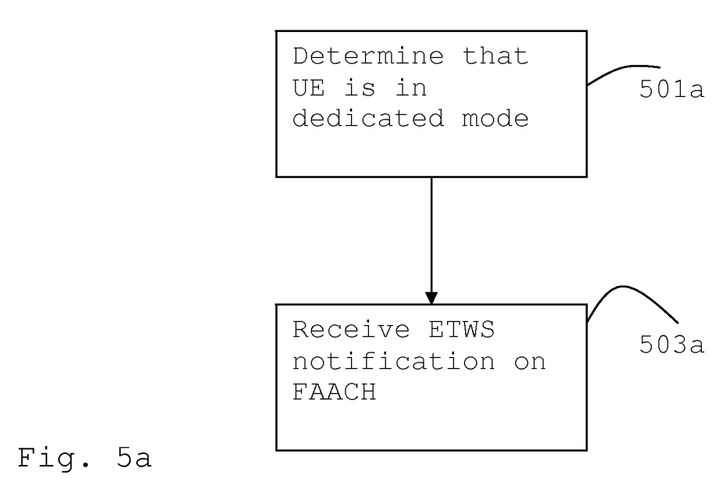
FIGS. 5a and 5b show flowcharts illustrating some procedural steps performed when receiving a ETWS notification in a User Equipment.
Figure 5B:
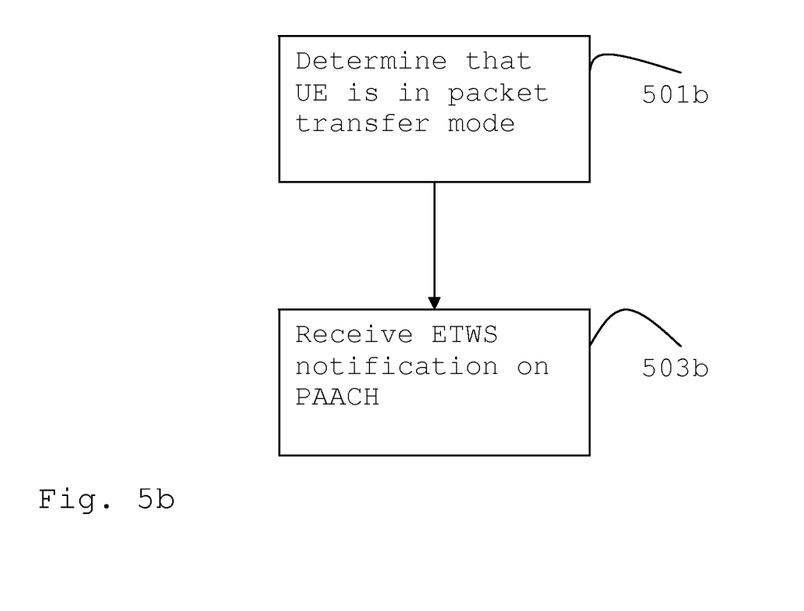

In accordance with one embodiment a procedure in a user equipment for receiving an earthquake and tsunami warning from a communication network node in a communication network system operating in GERAN is provided. In FIG. 5a an exemplary flow chart illustrating some procedural steps performed when receiving an ETWS notification in a User Equipment. The procedure comprises determining in a step 501a that user equipment is in a dedicated operation mode, and receiving in a step 503a an earthquake and tsunami warning system notification from said communication network node over the FACCH. The notification can be transmitted either with an application information message, a special control message or, a point-to-point SMS message transmitted on the FACCH. In case the information is transmitted in an application information message used for transmitting other data such as position data, this message can be extended to carry ETWS information. In FIG. 5b another exemplary flow chart illustrating some procedural steps performed when receiving an ETWS notification in a User Equipment. The procedure comprises determining in a step 501*b* that user equipment is in a packet transfer operation mode, and receiving in a step 503*b* an earthquake and tsunami warning system notification from said communication network node over the PACCH for example either by listening to a control channel or receiving said warning with a special control message. In case the information is transmitted in an application information message used for transmitting other data such as position data, this message can be extended to carry ETWS information.

Figure 6:
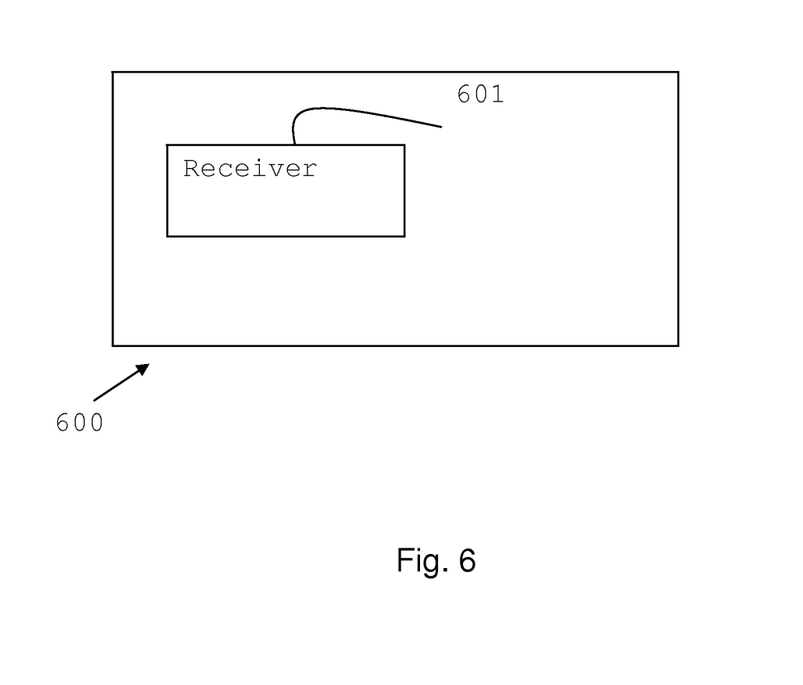
FIG. 6 shows a receiver for receiving an ETWS notification in a User Equipment

In FIG. 6, a user equipment 600 adapted to access a cellular radio system using GERAN is depicted. The user equipment comprises a receiver 601 adapted to receive an earthquake and tsunami warning from a communication network node in a communication network system. The receiver is adapted to, when said user equipment is in a dedicated operation mode, receiving an earthquake and tsunami warning system notification from said communication network node over the FACCH either with an application information message, a newly introduced control message or, a point-to-point SMS message. Alternatively the receiver of the user equipment is adapted to, when said user equipment is in a packet transfer operation mode, receiving an earthquake and tsunami warning system notification from said communication network node over the PACCH either by listening to a control channel or receiving said warning with a newly introduced control message. The User equipment can of course comprise a receiver adapted to receive a warning both on the FACCH and the PACCH channels.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

The invention claimed is:

1. A method in a base station subsystem (BSS) for providing an earthquake and tsunami warning system notification message to a user equipment (UE) accessing a cellular radio system using a GSM/EDGE Radio Access Network (GERAN), wherein the UE is in a packet transfer mode and the BSS uses a Common Control Channel (CCCH) to communicate information to UEs, the method comprising;
  the BSS receiving an earthquake and tsunami warning system notification from an emergency center, and
  the BSS, in response to receiving the earthquake and tsunami warning system notification, providing a warning system notification to the UE, wherein the step of providing the warning system notification comprises:
  i) the BSS transmitting to the UE a Packet Temporary Block Flow (TBF) Release message that configures the UE to listen to the CCCH, and
  ii) the BSS transmitting the warning system notification on the CCCH after transmitting the TBP Release message.

2. The method of claim 1, wherein the Packet TBF Release message is configured to cause the UE to enter an idle mode.

3. The method of claim 1, further comprising transmitting to the UE a Packet Paging Request (PPR) message in response to receiving the earthquake and tsunami warning system notification.

4. The method of claim 1, wherein transmitting the warning system notification on the CCCH comprises broadcasting the warning system notification on the CCCH.

5. A base station subsystem (BSS) for providing an earthquake and tsunami warning system notification message to a user equipment (UE) accessing a cellular radio system, comprising:
  a transmitter; and
  a receiver operable to receive an earthquake and tsunami warning system notification from an emergency center, wherein the BSS is adapted such that, in response to receiving an earthquake and tsunami warning system notification from an emergency center, the BSS:
  provides a warning system notification to the UE by:
  i) using the transmitter to transmit to the UE a Packet Temporary Block Flow (TBF) Release message that configures the UE to listen to the CCCH, and
  ii) using the transmitter to transmit the warning system notification on the CCCH after transmitting the TBF Release message.

6. The BSS of claim 5, wherein the Packet TBF Release message is configured to cause the UE to enter an idle mode.

7. The BSS of claim 5, further configured to transmit to the UE a Packet Paging Request (PPR) message in response to receiving the earthquake and tsunami warning system notification.

8. The BSS of claim 5, wherein transmitting the warning system notification on the CCCH comprises broadcasting the warning system notification on the CCCH.

* * * * *